(12) United States Patent
Liaw et al.

(10) Patent No.: US 9,074,036 B1
(45) Date of Patent: Jul. 7, 2015

(54) PREPARING METHOD FOR AQUEOUS EMULSION VIA DISPERSIBLE URETHANE ACRYLATE COPOLYMERIZATION

(71) Applicant: CHAMPWARD CHEMICAL INDUSTRIAL CO. LTD., Taichung (TW)

(72) Inventors: Der-Jang Liaw, Taichung (TW); Chi-Kuang Hu, Taichung (TW); Chun-Chin Wang, Taichung (TW)

(73) Assignee: CHAMPWARD CHEMICAL INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 14/580,542

(22) Filed: Dec. 23, 2014

(30) Foreign Application Priority Data

May 30, 2014  (TW) .............................. 103118947 A

(51) Int. Cl.
*C08G 18/12* (2006.01)
*C08F 283/00* (2006.01)
*C08G 18/75* (2006.01)
*C08G 18/34* (2006.01)
*C08G 18/67* (2006.01)
*C08G 18/76* (2006.01)

(52) U.S. Cl.
CPC .......... *C08F 283/008* (2013.01); *C08G 18/755* (2013.01); *C08G 18/348* (2013.01); *C08G 18/6755* (2013.01); *C08G 18/7671* (2013.01); *C08G 18/12* (2013.01)

(58) Field of Classification Search
CPC .. C08F 283/008; C08G 18/12; C08G 18/755; C08G 18/348; C08G 18/6755; C08G 18/7671

USPC .................. 525/455, 454, 450, 451; 524/427
See application file for complete search history.

(56) References Cited

U.S. PATENT DOCUMENTS

2003/0225239 A1 * 12/2003 Nakamura et al. .............. 528/59

* cited by examiner

Primary Examiner — Kelechi Egwim
(74) Attorney, Agent, or Firm — Bacon & Thomas, PLLC

(57) ABSTRACT

The present invention provides a method for preparing aqueous emulsion via water dispersible polyurethane grafted acrylate copolymerization, which first uses 2-8 wt % of isocyanate, 7-15 wt % of a polyol, 0.3-1.0 wt % of a polyol bearing hydrophilic carboxylic monomer, and 0.1~2.0 wt % of an acrylic ester containing a hydroxyl group to cause a reaction and form an unsaturated double bond bearing polyurethane prepolymer, the NCO content of which is approximately 2~8%. This is followed by introducing 0.3-1.0 wt % of an alkalic neutralizer to carry out a neutralization reaction, and then 25-40 wt % of pure water is used to effect water dispersion, after which 0.1~0.5 wt % of a chain extender is added to form an ethylenically unsaturated water dispersible polyurethane prepolymer. A reaction system is formed by adding 40-60 wt % of deionized water, 20~30 wt % of methyl methacrylate or an acrylate monomer to the ethylenically unsaturated water dispersible polyurethane prepolymer, and 0.1~2.0 wt % of a persulfate is used as an initiator to carry out emulsion polymerization. The aqueous emulsion via water dispersible polyurethane grafted acrylate copolymerization thus obtained is an eco-friendly solventless and pollution-free aqueous resin, and has a high molecular weight, a specific gravity of 1.03~1.07, which is slightly greater than that of water, excellent storage stability, good permeability, and is easily worked with. The water resistance of a dried coating of the aqueous emulsion is good, and also has high extensibility, excellent tensile strength, good adhesion, and superior wear resistance.

10 Claims, 1 Drawing Sheet

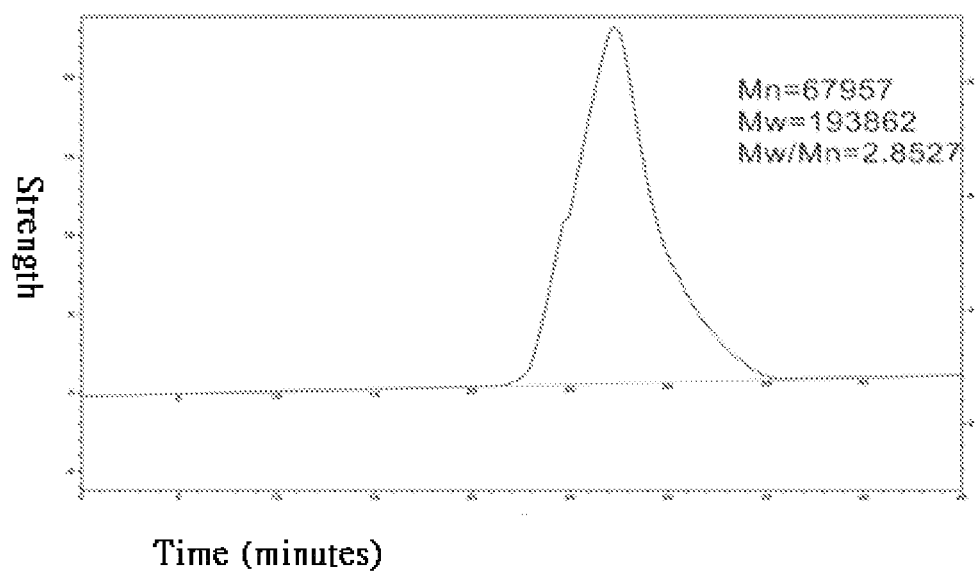

PREPARING METHOD FOR AQUEOUS EMULSION VIA DISPERSIBLE URETHANE ACRYLATE COPOLYMERIZATION

BACKGROUND OF THE INVENTION (a) Field of the Invention

The present invention relates to a water-dispersible polyurethane (hereinafter referred to as PU) resin, and a method for preparing aqueous emulsion via water-dispersible polyurethane grafted acrylate copolymerization, and more particularly relates to a copolymerization method for side grafting an acrylic monomer to a water-dispersible PU long chain to enable providing a pollution-free water-dispersible PU copolymer acrylic emulsion, which possesses characteristics of PU and acrylic. The resin emulsion has a large molecular weight, homogeneous distribution, and a good appearance. Its specific gravity is slightly greater than that of water, has excellent storage stability, good permeability, and is easily worked with. The water resistance of a dried coating of the aqueous emulsion is good, and also has high extensibility, excellent tensile strength, good adhesion, and superior wear resistance.

(b) Description of the Prior Art

Traditionally, an aqueous polyurethane emulsion is formed by direct emulsification using a stirring and mixing device with a strong shearing force on a low molecular weight emulsifier from a prepolymer produced from isocyanate and a polyol. However, the stability of the aqueous polyurethane emulsion is poor. If an aqueous polyurethane emulsion of higher stability is required, then a reaction is carried out between an polyisocyanate, a polyol, and a polyol bearing hydrophilic carboxylic monomer to form a polyurethane prepolymer having isocyanate as the terminal group and containing a hydrophilic functional group. Water dispersion is then effected using a high-speed stirring device, after which a diamine compound is added to serve as a chain extender to form the emulsion.

As for the preparation of an acrylic emulsion, an acrylic monomer in an aqueous solution is used, and a low molecular weight emulsifier is adopted to carry out an emulsion polymerization reaction. The monomer in water or other solvent, along with an initiator and an emulsifier, is then mechanically stirred, which together with the effect of the emulsifier causes the monomer to disperse and become an emulsion state; the acrylic emulsion is thus obtained by carrying out free-radical polymerization thereof. However, if production of a solid polymer is required, then the acrylic emulsion must undergo a multi-step procedure involving de-emulsification, washing, dehydration, and drying. This results in high production costs, and the impurities in the polymer emulsion obtained are difficult to remove completely, which will affect the electrical properties of the polymer emulsion. Furthermore, the solid polymer is also inappropriate to work with because of its shortcomings including easily becoming brittle at low temperatures, and being prone to become tacky at high temperatures.

Polyurethane has characteristic properties including excellent low temperature flexibility and wear resistance, and good elasticity. However, for non-polar base materials, polyurethane has shortcomings including poor wettability, intolerance to high temperature, poor water resistance, and poor weathering resistance. Acrylic has good water resistance and weathering resistance, but has the shortcomings of easily becoming brittle at low temperatures, and being prone to become tacky at high temperatures. Hence, there is an urgent need to solve these problems. Accordingly, the task of the present invention is to overcome and resolve each of the aforementioned shortcomings, and make up for their deficiencies by combining the advantages of polyurethane and acrylic.

SUMMARY OF THE INVENTION

In light of the aforementioned problems, the objective of the present invention lies in synthesizing a polyurethane acrylic copolymer emulsion having excellent low temperature flexibility and wear resistance, good elasticity, water resistance, and weathering resistance, as well as having extremely strong wettability and permeability, together with better stability.

The present inventors having carefully reviewed the results of their research, discovered that 2~8 wt % of isocyanate and 7~15 wt % of a polyol, 0.3~1.0 wt % of a polyol bearing hydrophilic carboxylic monomer and 0.1~2.0 wt % of an acrylic ester containing a hydroxyl group reacted to form an unsaturated double bond bearing aqueous polyurethane prepolymer. The polyol bearing hydrophilic carboxylic monomer was able to polymerize with isocyanate, causing the prepolymer to disperse in water. And because the hydroxyl group of the acrylic ester containing a hydroxyl group can polymerize with isocyanate and cause the prepolymer to bear an unsaturated double bond, thus it is able to polymerize with an alkyl methacrylate or with an acrylate monomer. This was followed by introducing 0.3-1.0 wt % of an alkalic neutralizer to carry out a neutralization reaction, and then 25-40 wt % of pure water was used to effect water dispersion, after which 0.1~0.5 wt % of a chain extender was added to form an ethylenically unsaturated aqueous polyurethane (PU).

Then, 40-60 wt % of deionized water, 20~30 wt % of an alkyl methacrylate or an acrylate monomer were added to the aforementioned ethylenically unsaturated aqueous PU, and 0.1~2.0 wt % of a persulfate initiator was used to carry out emulsion polymerization. The aqueous resin emulsion produced is an eco-friendly solventless, pollution-free aqueous resin. The molecular weight of such a grafted copolymer of this high molecular weight emulsion reached as high as 200,000, and water resistance is good. Water absorption of a dried coating of the aqueous resin emulsion is low, with water absorption after three days being below 1.2%. The aqueous resin emulsion has high extensibility reaching upward of 1000%, has excellent tensile strength reaching over 100 kgf/$cm^2$, and superior wear resistance reaching a minimum of 1.5 mg.

The emulsion polymerization reaction of the present invention used isocyanate and an acrylic ester containing a hydroxyl group. And because the hydroxyl group can react with the isocyanate and cause the prepolymer to bear an unsaturated double bond, it is able to copolymerize with an alkyl methacrylate or with an acrylate monomer. Upon completion of the aqueous polyurethane step, a persulfate was then added to serve as an initiator, to enable reaction of an acrylic monomer, namely the acrylic ester containing a hydroxyl group, to form the main chain of the aqueous polyurethane, and subsequent side-chain grafting of the acrylic to the side chain of the aqueous polyurethane containing a carbon-carbon double bond, thereby forming a copolymer composition, and causing the aqueous polyurethane to have the characteristics of an acrylic resin.

Examples of the isocyanate used in the present invention include toluene diisocyanate (hereinafter referred to as TDI), methylene diisocyanate (hereinafter referred to as MDI), hexamethylene diisocyanate (hereinafter referred to as HDI), isophorone diisocyanate (hereinafter referred to as IPDI), polyphenylene polyisocyanate (hereinafter referred to as PAPI), 1,5-naphthalene diisocyanate (hereinafter referred to as NDI), hydrogenated diisocyanate (hereinafter referred to as H-12MDI), xylene diisocyanate (hereinafter referred to as XDI), para phenylene diisocyanate (hereinafter referred to as PPDI), and the like.

Examples of the polyol used in the present invention include polyester polyol, polyether polyol, polycaprolactone, amino polyether polyol, polyethylene glycol, polyolefin glycol, and the like.

Examples of the polyol bearing hydrophilic carboxylic monomer used in the present invention include dihydroxymethyl propanic acid (hereinafter referred to as DMPA), diethylenetriamine (hereinafter referred to as DETA), methyldiethanolamine (hereinafter referred to as MDEA), and the like.

Examples of the acrylic ester monomer containing a hydroxyl group used in the present invention include 2-hydroxyethyl methacrylate (hereinafter referred to as HEMA), hydroxyethyl acrylate (hereinafter referred to as HEA).

Although the initiator of the present invention can use one type or more than one type selected and formed from a group consisting of conventional benzoyl peroxide (BPO), azobisisobutyronitrile (AIBN), ammonium persulfate, potassium peroxydisulfate, sodium peroxydisulfate, and peroxides of hydrogen peroxide to serve as an initiator, and effect initialization; however, in the present invention it is preferred to use a persulfate, such as potassium peroxydisulfate (hereinafter referred to as $K_2S_2O_8$) ammonium persulfate (hereinafter referred to as $(NH_4)_2S_2O_8$), sodium peroxydisulfate (hereinafter referred to as $Na_2S_2O_8$)

The acrylic monomer used in the present invention was decided upon by considering adhesivity of the aqueous acrylic emulsion, viscosity or stability of the emulsion, and each glass transition temperature (Tg) needed to be set within a predetermined range. Tg of the acrylic monomer component was set at –20~40° C., with 15~35° C. being preferred.

The preferred solid content of the emulsion was set at 40~60%, which enabled easy control over the viscosity when producing the aqueous emulsion, as well as increasing agglutination strength, and ensuring that the form of the aqueous emulsion obtained did not contain any organic solvents.

Although there is no particular restriction on the acrylic monomer suitable for use in the present invention, examples of an alkyl methacrylate or an acrylate monomer include one type or more than one type selected and formed from the group consisting of methyl methacrylate (hereinafter referred to as MMA), ethyl methacrylate (hereinafter referred to as EMA), n-butyl methacrylate (hereinafter referred to as n-BMA), i-butyl methacrylate (hereinafter referred to as i-BMA), t-butyl methacrylate (hereinafter referred to as t-BMA), methyl acrylate (hereinafter referred to as MA), ethyl acrylate (hereinafter referred to as EA), n-butyl acrylate (hereinafter referred to as n-BA), i-butyl acrylate (hereinafter referred to as i-BA), t-butyl acrylate (hereinafter referred to as t-BA), 2-ethyl hexyl scrylate (hereinafter referred to as 2-EHA), 2-ethyl hexyl methylacrylate (hereinafter referred to as 2-EHMA), lauric methyl acrylate (hereinafter referred to as LMA), glycyl methacrylate (hereinafter referred to as GMA). And when necessary, apart from the acrylate monomers, a combination of monomers such as vinyl acetate and styrene can also be used.

Compared to aqueous polyurethane emulsions obtained from traditional methods, the polyurethane acrylic copolymer emulsion obtained from the present invention has excellent low temperature flexibility, wear resistance, water resistance, and weathering resistance, as well as extremely strong wettability and permeability, and better stability. The polyurethane acrylic copolymer emulsion of the present invention is able to improve the shortcomings of non-polar base materials, including poor wettability, intolerance to high temperature, poor water resistance, and poor weathering resistance.

Examples of the neutralizer used in the preparation method of the present invention include trimethyl amine (hereinafter referred to as TMA), diethylamine (hereinafter referred to as DEA), triethylamine (hereinafter referred to as TEA), tributylamine (hereinafter referred to as TBA), tripropylamine (hereinafter referred to as TPA), sodium hydroxide (hereinafter referred to as NaOH), 2-amino-2-methyl-1-propanol (hereinafter referred to as AMP-95), and the like.

The polyurethane acrylic grafted copolymer emulsion prepared by the polymerization method of the present invention is provided with extremely strong wettability, permeability, and storage stability, and can be produced at low cost. A dried coating of the emulsion is provided with excellent mechanical properties (including extensibility, tensile strength, and tear strength), wear resistance, water resistance, and weathering resistance.

The present invention relates to a polymerization method for aqueous polyurethane grafted acrylic emulsion, and more particularly relates to a copolymerization method for side grafting an acrylic monomer to a long chain PU, and uses 2-8 wt % of isocyanate and 7-15 wt % of a polyol, 0.3~1.0 wt % of a polyol bearing hydrophilic carboxylic monomer and 0.1~2.0 wt % of an acrylic ester containing a hydroxyl group to cause a reaction and form an unsaturated double bond bearing aqueous polyurethane prepolymer. This is followed by introducing 0.3-1.0 wt % of an alkalic neutralizer to carry out a neutralization reaction, and then 25-40 wt % of pure water is used to effect water dispersion, after which 0.1~0.5 wt % of a chain extender is added to form an ethylenically unsaturated aqueous PU.

Then, 40-60 wt % of deionized water, 20~30 wt % of an alkyl methacrylate or an acrylate monomer were added to the aforementioned ethylenically unsaturated aqueous PU, and 0.1~2.0 wt % of a persulfate initiator was used to carry out emulsion polymerization. The aqueous resin emulsion produced is an eco-friendly solventless, pollution-free aqueous resin. The molecular weight of such a grafted copolymer of the high molecular weight emulsion reached as high as 200, 000. And the water absorption of a dried coating of the emulsion is low, with good water resistance. Water absorption after three days is below 1.2%, and the emulsion has high extensibility reaching upward of 1000%, with excellent tensile strength reaching over 100 kgf/cm$^2$, as well as having superior wear resistance reaching a minimum of 1.5 mg.

The isocyanate, polyol, polyol bearing hydrophilic carboxylic monomer, and the acrylic ester monomer containing a hydroxyl group were first weighed out, and stirring at a rotational speed of 150~300 RPM was started. The temperature was maintained at 80~100° C., and only when the reaction reached a state in which the actual measurement of NCO % approximately equaled the theoretical value of NCO % was the temperature allowed to drop to between 50~70° C. The neutralizer was then added, and stirring continued for 30 minutes. The temperature was then allowed to fall to 30~40° C., the stirring speed was increased to 500~700 RPM, and at the same time deionized water was added to effect water dispersion. After all the deionized water had been added, the chain extender was slowly titrated, and when all the chain extender had been added, the reaction was allowed to continue for a further 1 hour. After completion of the reaction, water and the initiator were added, the mixture was stirred at a rotational speed of 150~300 RPM, and the temperature was raised to 70~90° C., whereupon the acrylic monomer was slowly titrated, with the titration being completed within 50~180 minutes. The reaction was allowed to continue for approximately 30~50 minutes while maintaining the temperature and stirring speed. The heater was then switched off, but stirring was continued allowing the temperature to fall naturally. The polyurethane acrylic copolymer emulsion was obtained when the temperature had fallen to room temperature.

As to how the polyurethane acrylic copolymer emulsion is formed using the preparation method as disclosed in the present invention, the main principle lies in use of the acrylic ester monomer containing a hydroxyl group, in which the hydroxyl group is able to react with the isocyanate to form the main chain of the aqueous polyurethane, and on the end of the main chain there is a carbon-carbon double bond bearing side chain, which can be used to graft acrylic thereto. Then, the aqueous polyurethane grafted acrylic copolymer emulsion can be formed via acrylic synthesis.

The present invention relates to a copolymerization method for an aqueous polyurethane grafted acrylic, and more particularly relates to a copolymerization method for side grafting an acrylic monomer to a long chain PU. The reaction system is primarily composed of 40-60 wt % of deionized water, 10~20 wt % of an aqueous polyurethane, and 20~40 wt % of an alkyl methacrylate or an acrylate monomer, and does not use organic solvents, or cosolvents, or amphiprotic solvents.

The rise of environmental awareness in recent years has resulted in traditional oil-based polyurethane products being gradually replaced by water-based polyurethane products. And trends to look forward to regarding the technical application of water-based polyurethane or the developmental aspect of the various types of functional materials include environment-friendly manufacturing processes and development of low-cost synthesis methods.

The aqueous polyurethane emulsion of the present invention has application in areas such as pollution-free adhesives, bindings, the printing ink industry, the textile industry, the tanner industry, building coatings, and woodware paint. The copolymerization method for aqueous polyurethane grafted acrylic of the present invention can provide an environmental protective and pollution-free water-dispersible polyurethane copolymer acrylic emulsion, which possesses characteristics of both polyurethane and acrylic, and has a high molecular weight. The polyurethane copolymer acrylic emulsion of the present invention is able to improve the problems of poor water resistance and weathering resistance of aqueous polyurethane, as well as lowering costs. Moreover, the increase in solid content enables application in the aforementioned areas.
(Test Methods)
(Emulsion Properties)
1. Glass Transition Temperature Tg (° C.)
A differential scanning calorimeter (DSC) manufactured by METTLER-TOLEDO Instruments Inc. was used to determine Tg points.
2. Specific Gravity
Test samples of the emulsion were prepared according to the K7232 standard of the Japan Industrial Standards (JIS) to determine their specific gravity.
3. pH Value
Test samples of the emulsion were prepared according to section 12 paragraph 10 of the K0400 standard of the Japan Industrial Standards (JIS) to determine their pH value.
4. Storage Stability
Test samples of the emulsion were prepared according to section 2 paragraph 7 of the K5600 standard of the Japan Industrial Standards (JIS) to determine their storage stability.
5. Freeze Stability
Test samples of the emulsion were prepared according to section 2 paragraph 6 of the K5600 standard of the Japan Industrial Standards (JIS) to determined their freeze stability.
(Emulsification Properties)
NCO % value
Test samples of the emulsion were prepared according to the K1556-2006 standard of the Japan Industrial Standards (JIS) to determine their NCO % values
(Coating Properties of the Emulsion)
1. Tensile Strength
Test samples of the emulsion were prepared according to the K6251 standard of the Japan Industrial Standards (JIS) to determine their tensile strength.
2. Tear Strength
Test samples of the emulsion were prepared according to the K6252 standard of the Japan Industrial Standards (JIS) to determine their tear strength.
3. Extensibility
Test samples of the emulsion were prepared according to the K6251 standard of the Japan Industrial Standards (JIS) to determine their extensibility.
4. Coating Hardness
Test samples of the emulsion were prepared according to the K6253 standard of the Japan Industrial Standards (JIS) to determine their coating hardness.
5. Water Absorption
Test samples of the emulsion were prepared according to the K7112 standard of the Japan Industrial Standards (JIS) to determine their water absorption.
6. Wear Resistance
Test samples of the emulsion were prepared according to the K5600 standard of the Japan Industrial Standards (JIS) to determine their wear resistance.

To enable a further understanding of said objectives and the technological methods of the invention herein, a brief description of the drawings is provided below followed by a detailed description of the preferred embodiments.

BRIEF DESCRIPTION OF THE DRAWINGS

FIG. 1 is a distribution curve of polymer molecular weights of water dispersible polyurethane grafted acrylic emulsion obtained by the method of the present invention.

DETAILED DESCRIPTION OF THE PREFERRED EMBODIMENTS

Below is a detailed description of the embodiments of the copolymerization method for water dispersible polyurethane grafted acrylic emulsion according to the present invention. However, the content of the embodiments described herein are merely illustrative of the principles of the present invention and thus not limited thereto.
(with Reference to Embodiments 1-4)
Embodiments 1~2 used the same isocyanate, however, different glass transition temperatures (Tg) were used.
Embodiments 2~3 used identical glass transition temperatures (Tg), however, different isocyanates were used.
Embodiments 2, 4 used the same glass transition temperatures (Tg), however, a mixture of isocyanates were used.
The basic composition and emulsion properties, coating properties, and emulsion functional performance of the water dispersible polyurethane grafted acrylic emulsion obtained are as shown in Table 1.

Embodiments 1-4

The following were weighed out according to the basic compositions depicted in Table 1: isocyanate (embodiments 1 and 2 used IPDI (isophorone diisocyanate) (DESMODUR I manufactured and sold by BAYER); embodiment 3 used H-12MDI (DESMODUR W manufactured and sold by BAYER); embodiment 4 used a mixture of isocyanates), polyol (using DIOL1021 manufactured and sold by BAYER), a polyol bearing hydrophilic carboxylic monomer (DMPA manufactured and sold by GEO SPECIALITY CHEMICALS Inc. Was used), an acrylic ester monomer containing a hydroxyl group (monomer A used HEMA manufactured and sold by KAOHSIUNG MODUMER CO. LTD.). Stirring was begun, the temperature was maintained at 80~100° C., and the reaction was allowed to continue until it reached a state in which the actual measurement of NCO % approximately equaled the theoretical value of NCO %. Then, when the temperature had dropped to between 50~70° C., a neutralizer was added, and stirring continued for 30 minutes, whereupon the temperature was allowed to fall to 30~40° C. The stirring speed was increased and at the same time deionized water was added to effect water dispersion. After all the deionized water had been added, a chain extender was slowly titrated, and after reacting for 1 hour, water and an initiator were added. The mixture was stirred at a rotational speed of 150~300 RPM, and the temperature raised to 70~90° C. The titration was completed within 50~180 minutes, and then an acrylate or an alkyl methacrylate monomer was added. After reacting for approximately 30~50 minutes, the heater was switched off, but stirring was allowed to continue. The polyurethane acrylic copolymer emulsion was obtained when the temperature had fallen to room-temperature.

The molecular weight distribution situation of the water dispersible polyurethane grafted acrylic emulsion obtained can be directly obtained from the polymer molecular weight distribution curve, the results of which are shown in FIG. 1.

The molecular weight of such a grafted copolymer of the high molecular weight emulsion reached as high as 200,000, and water absorption of a dried coating of the emulsion is low, with good water resistance. Water absorption after three days was below 1.2%, and the emulsion had high extensibility reaching upward of 1000%, excellent tensile strength reaching over 100 kgf/cm$^2$, and superior wear resistance reaching a minimum of 1.5 mg.

Table 1: Emulsion composition, emulsion properties, emulsion functional performance, and coating properties of embodiments

|  | Embodiment No. | | | |
| --- | --- | --- | --- | --- |
|  | 1 | 2 | 3 | 4 |
| Basic Composition | | | | |
| isocyanate (wt %) | IPDI (3) | IPDI (3) | H-12MDI (3.2) | IPDI:H-12MDI (1.4:1.6) |
| polyol (wt %) | DIOL1021 (9) | DIOL1021 (9) | DIOL1021 (9) | DIOL1021 (9) |
| Polymerizable hydrophilic radical containing hydroxyl group (wt %) | DMPA (0.4) | DMPA (0.4) | DMPA (0.4) | DMPA (0.4) |
| Neutralizer (wt %) | triethylamine (0.1) | triethylamine (0.1) | triethylamine (0.1) | triethylamine (0.1) |
| Deionized water (wt %) | 59.2 | 60.6 | 60.3 | 60.3 |
| Chain extender (wt %) | ethylenediamine (0.5) | ethylenediamine (0.5) | ethylenediamine (0.5) | ethylenediamine (0.5) |
| Emulsifier (wt %) | sodium dodecyl sulfonate (0.9) | sodium dodecyl sulfonate (0.9) | sodium dodecyl sulfonate (0.9) | sodium dodecyl sulfonate (0.9) |
| Initiator (wt %) | $K_2S_2O_8$ (0.2) | $K_2S_2O_8$ (0.2) | $K_2S_2O_8$ (0.2) | $K_2S_2O_8$ (0.2) |
| Monomer | | | | |
| A (wt %) | HEMA (0.1) | HEMA (0.1) | HEMA (0.1) | HEMA (0.1) |
| B (wt %) | MMA (6.6) | MMA (0.6) | MMA (0.6) | MMA (0.6) |
| C (wt %) | n-BMA (20.0) | n-BMA (24.6) | n-BMA (24.6) | n-BMA (24.6) |
| D (wt %) | — | 2-EHA (0.1) | 2-EHA (0.1) | 2-EHA (0.1) |
| Emulsion properties | | | | |
| Acrylic glass transition temperature Tg (° C.) | 35 | 15 | 15 | 15 |
| Solid content (%) | 40.8 | 39.4 | 39.7 | 39.7 |
| Specific gravity | 1.03 | 1.05 | 1.04 | 1.07 |
| pH value | 6.72 | 6.05 | 6.86 | 6.69 |
| Storage stability (0° C.~45° C.) | ◎ | ◎ | ◎ | ◎ |
| Freeze stability (repeated unfreezing 6 times) | ◎ | ◎ | ◎ | ◎ |
| Coating properties | | | | |
| Tear strength (kgf/cm) | 24.53 | 11.42 | 53.81 | 42.14 |
| Tensile strength (kgf/cm$^2$) | 140.0 | 32.42 | 80.41 | 75.54 |

-continued

| | Embodiment No. | | | |
|---|---|---|---|---|
| | 1 | 2 | 3 | 4 |
| Extensibility (%) | 67.8 | 1006 | 374 | 473 |
| Hardness (Shore hardness A) | 73 | 48 | 75 | 73 |
| 3-day water absorption (%) | 0.6 | 1.2 | 1.1 | 1.2 |
| Wear resistance (mg) | 1.5 | 5.2 | 2.9 | 2.3 |

From Table 1 it can be seen that in embodiments 2, 3, and 4 of the water dispersible polyurethane grafted acrylic emulsion prepared by the method of the present invention have relatively low glass transition temperatures (15.0° C.), which differs from the relatively high glass transition temperature (35.0° C.) of embodiment 1. However, blending can be used to accommodate the requirements of physical properties of coating products. The water dispersible polyurethane grafted acrylic emulsion prepared by the polymerization method described in the present invention has a high molecular weight, good wear resistance, water resistance, and weathering resistance, as well as very strong wettability and permeability properties, and has application in all kinds of building coatings.

Regardless of the isocyanate or acrylic ester monomer containing a hydroxyl group used to carry out the emulsion polymerization method, the water dispersible polyurethane grafted acrylic emulsion obtained from the preparation method of the present invention has good storage stability and freezing stability, and has application in various types of working environments. Moreover, because it does not contain any organic solvents, the aqueous emulsion of the present invention is more suitable for use as a coating from safety and hygiene aspects. And it is especially suitable for use in products requiring high adhesive and mechanical strength, as well as building materials having stringent residual solvent requirements.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A method for preparing aqueous emulsion via water dispersible polyurethane grafted acrylate copolymerization, comprising the following steps (1)~(3):
(1) using 2-8 wt % of isocyanate and 7-15 wt % of a polyol, 0.3~1.0 wt % of a polyol bearing hydrophilic carboxylic monomer and 0.1~2.0 wt % of an acrylic ester containing a hydroxyl group to carry out a reaction and form an unsaturated double bond bearing polyurethane prepolymer, with NCO content of approximately 2~8%;
(2) followed by introducing 0.3-1.0 wt % of an alkalic neutralizer to carry out a neutralization reaction, and then using 25-40 wt % of pure water to effect water dispersion, after which adding 0.1~0.5 wt % of a chain extender to form an ethylenically unsaturated water dispersible polyurethane;
(3) forming a reaction system by adding 40-60 wt % of deionized water, and 20~30 wt % of an alkyl methacrylate or acrylate monomer to 10~20 wt % of the ethylenically unsaturated water dispersible polyurethane, then using 0.1~2.0 wt % of a persulfate initiator to carry out emulsion polymerization, thereby obtaining the aqueous emulsion via water dispersible polyurethane grafted acrylate copolymerization.

2. The method as described in claim 1, wherein the isocyanate used is one type or more than one type selected and formed from a group consisting of toluene diisocyanate, methylene diisocyanate, hexamethylene diisocyanate, isophorone diisocyanate, polyphenylene polyisocyanate, 1,5-naphthalene diisocyanate, phenylethane diisocyanate, hydrogenated diisocyanate, xylene diisocyanate, and para phenylene diisocyanate.

3. The method as described in claim 1, wherein a methacrylate ester or an acrylate monomer is one type or more than one type selected and formed from a group consisting of methyl methacrylate, ethyl methacrylate, n-butyl methacrylate, i-butyl methacrylate, t-butyl methacrylate, methyl acrylate, ethyl acrylate, n-butyl acrylate, i-butyl acrylate, t-butyl acrylate, 2-ethyl hexyl scrylate, 2-ethyl hexyl methylacrylate, and lauric methyl acrylate.

4. The method as described in claim 1, wherein the polyol used is one type or more than one type selected and formed from a group consisting of a polyester polyol, a polyether polyol, polycaprolactone, amino polyether polyol, polyethylene glycol, and polyolefin glycol.

5. The method as described in claim 1, wherein the polyol bearing hydrophilic carboxylic monomer used is one type or more than one type selected and formed from a group consisting of dihydroxymethyl propanic acid, diethylenetriamine, and methyldiethanolamine.

6. The method as described in claim 1, wherein the acrylic ester monomer containing a hydroxyl group used is one type or more than one type selected and formed from a group consisting of ethyl methacrylate, 2-hydroxyethyl acrylate, 2-hydroxypropyl acrylate, and glycyl methacrylate.

7. The method as described in claim 1, wherein the neutralizer used is one type or more than one type selected and formed from a group consisting of trimethyl amine, diethylamine, triethylamine, tributylamine, tripropyl amine, sodium hydroxide, 2-amino-2-methyl-1-propanol, and an alcamine.

8. The method as described in claim 1, wherein the chain extender used is one type or more than one type selected and formed from a group consisting of hydrazine, ethylene diamine, isophoronediamine, cyclohexane-1,4-diamineethylene glycol, propylene glcol, diethanolamine, and triethanolamine.

9. The method as described in claim 1, wherein the initiator used to carry out free-radical polymerization is one type or more than one type selected and formed from a group consisting of benzoyl peroxide, sodium persulfate, ammonium persulfate, potassium peroxydisulfate, and hydrogen peroxide.

10. The method as described in claim 1, wherein the emulsifier used is one type or more than one type of selected and formed from a group consisting of anionic emulsifiers such as sodium dodecyl sulfonate, potassium dodecyl sulfonate, and ammonium dodecyl sulfonate.

* * * * *